United States Patent [19]

Klomp et al.

[11] Patent Number: 4,489,595
[45] Date of Patent: Dec. 25, 1984

[54] ENGINE AIR INLET PRESSURE MEASUREMENT

[75] Inventors: Edward D. Klomp, Mt. Clemens; Rodney B. Rask, Grosse Pointe Woods, both of Mich.

[73] Assignee: General Motors Corporation, Detroit, Mich.

[21] Appl. No.: 479,170

[22] Filed: Mar. 28, 1983

[51] Int. Cl.³ .................... G01M 15/00; G01L 7/08
[52] U.S. Cl. .................................. 73/115; 73/118; 73/714
[58] Field of Search ............... 73/115, 714, 716–722, 73/118

[56] References Cited

U.S. PATENT DOCUMENTS 3,937,202  2/1976  Heath ........................... 73/115
4,428,227  1/1984  Yamagata ..................... 73/115

Primary Examiner—Donald O. Woodiel
Attorney, Agent, or Firm—C. K. Veenstra

[57] ABSTRACT

The pressure of the air delivered to an internal combustion engine is measured by sensing the difference between the pressure in the inlet of the engine induction passage and the pressure in an accelerated air flow region of the engine induction passage when the engine throttle is closed.

10 Claims, 3 Drawing Figures

ENGINE AIR INLET PRESSURE MEASUREMENT

TECHNICAL FIELD

This invention relates to measurement of the pressure in an engine air inlet.

BACKGROUND

Many systems for controlling automotive engines require a measure of the pressure in the engine air inlet. In naturally aspirated engines, that pressure is substantially atmospheric or barometric pressure. To provide such a measure, barometric pressure sensors generally include an aneroid or other pressure sensitive member which responds to the difference between the inlet pressure and the pressure in an evacuated chamber. Because the absolute pressure in the evacuated chamber is near zero, the position of the pressure sensitive member indicates the absolute value of the inlet pressure.

SUMMARY OF THE INVENTION

This invention provides an engine air inlet assembly and a method for measuring the pressure in an engine air inlet which do not require an evacuated chamber.

This invention is based upon a realization that the pressure in certain regions of an engine air induction passage is proportional to the pressure in the engine air inlet during particular engine operating conditions. With this invention, the pressure in the engine air inlet is measured by measuring the difference between the inlet pressure and the pressure in such a region during those engine operating conditions. For example, when a throttle in the engine air induction passage is closed, air flow to the engine through a restricted region adjacent the throttle is sonic and the pressure in that region is proportional to the pressure in the engine air inlet. The difference between the inlet pressure and the pressure adjacent the throttle when the throttle is closed therefore is a measure of the inlet pressure.

The details as well as other features and advantages of this invention are set forth in the remainder of the specification and are shown in the accompanying drawing.

THE FIRST EMBODIMENT

Figure 1:
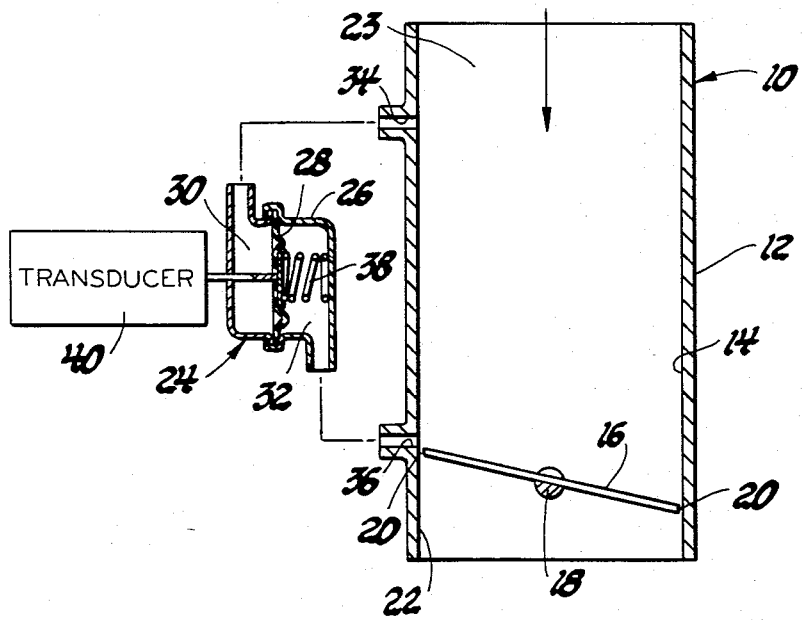
FIG. 1 is a schematic view of an engine air inlet assembly incorporating one embodiment of this invention.

Referring first to FIG. 1, an engine air inlet assembly 10 includes an air inlet body 12 defining an induction passage 14 for air flow to the engine. A butterfly throttle 16 is disposed in induction passage 14 on a throttle shaft 18 and is rotatable from the closed position shown to an open position to vary air flow through induction passage 14.

A pair of air flow areas 20 are defined between the opposite edges of throttle 16 and the cylindrical wall 22 of induction passage 14. Air flow areas 20 vary from a minimum with throttle 16 in the closed position shown to a maximum when throttle 16 is rotated to its wide open position. Rotation of throttle 16 to vary air flow areas 20 controls air flow from the inlet zone 23 of induction passage 14 to the engine.

A sensor 24 includes a housing 26 divided by a diaphragm 28 to form an inlet pressure sensing chamber 30 and a reduced pressure sensing chamber 32. Inlet pressure sensing chamber 30 is connected to an inlet pressure port 34 opening from the inlet zone 23 of induction passage 14. Reduced pressure sensing chamber 32 is connected to a reduced pressure port 36 opening from induction passage 14 immediately above the edge of throttle 16 when throttle 16 is in the closed position shown; port 36 therefore opens from a region of induction passage 14 where the air flow is accelerated to pass through the minimum flow area 20 between throttle 16 and the induction passage wall 22. The difference in pressure between the inlet pressure at port 34 and the reduced pressure at port 36 displaces diaphragm 28 rightwardly against the bias of a spring 38, and the displacement of diaphragm 28 is measured by a strain gage or other transducer 40. Transducer 40 produces an electrical signal which varies with the displacement of diaphragm 28.

The difference between the pressure at port 34 and the pressure at port 36 when throttle 16 is in the closed position shown is proportional to the pressure in the inlet zone 23. The signal from transducer 40 accordingly is a measure of the absolute value of the inlet air pressure during closed throttle operation.

When throttle 16 is rotated from the closed position shown, port 36 no longer opens from the region of accelerated air flow. During open throttle operation, port 36 opens to the induction passage 14 downstream of throttle 16, and the pressure at port 36 is intermediate the minimum pressure which occurs near area 20 and the higher but still subatmospheric manifold pressure which generally prevails below throttle 16. As throttle 16 is rotated increasingly from the closed position shown, the pressure in chamber 32 approaches the manifold pressure.

THE SECOND EMBODIMENT

Figure 2:
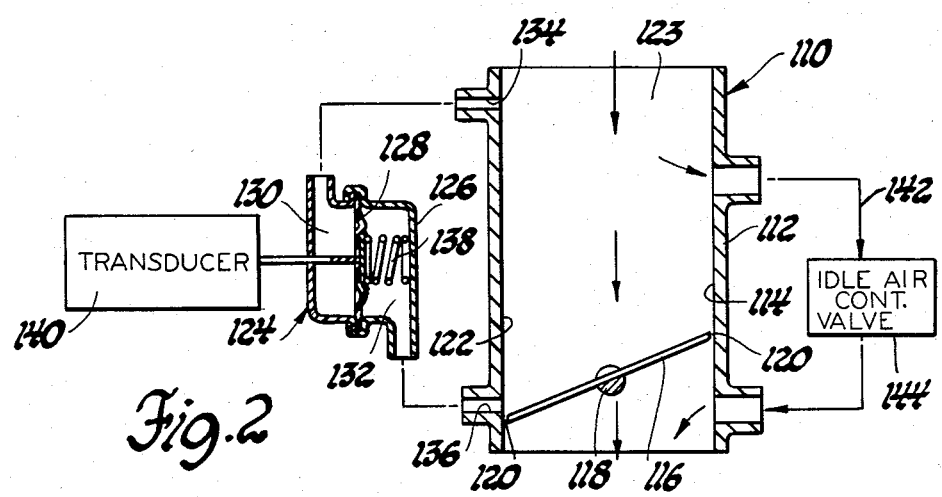
FIG. 2 is a schematic view of another engine air inlet assembly incorporating another embodiment of this invention.

Referring now to FIG. 2, an engine air inlet assembly 110 includes an air inlet body 112 defining an induction passage 114 for air flow to the engine. A butterfly throttle 116 is disposed in induction passage 114 on a throttle shaft 118 and is rotatable from the closed position shown to an open position to vary air flow through induction passage 114.

A pair of air flow areas 120 are defined between the opposite edges of throttle 116 and the cylindrical wall 122 of induction passage 114. Air flow areas 120 vary from a minimum with throttle 116 in the closed position shown to a maximum when throttle 116 is rotated to its wide open position. Rotation of throttle 116 to vary air flow areas 120 controls air flow from the inlet zone 123 of induction passage 114 to the engine.

A sensor 124 includes a housing 126 divided by a diaphragm 128 to form an inlet pressure sensing chamber 130 and a reduced pressure sensing chamber 132. Inlet pressure sensing chamber 130 is connected to an inlet pressure port 134 opening from the inlet zone 123 of induction passage 114. Reduced pressure sensing chamber 132 is connected to a reduced pressure port 136 opening from induction passage 114 immediately above the edge of throttle 116 when throttle 116 is in the closed position shown; port 136 therefore opens from a region of induction passage 114 where the air flow is accelerated to pass through the minimum flow area 120 between throttle 116 and the induction passage wall 122. The difference in pressure between the inlet pressure at port 134 and the reduced pressure at port 136 displaces diaphragm 128 rightwardly against the bias of a spring 138, and the displacement of diaphragm 128 is measured by a strain gage or other transducer 140. Transducer 140 produces an electrical signal which varies with the displacement of diaphragm 128.

The difference between the pressure at port 134 and the pressure at port 136 when throttle 116 is in the closed position shown is proportional to the pressure in the inlet zone 123. The signal from transducer 140 accordingly is a measure of the absolute value of the inlet air pressure during closed throttle operation.

When throttle 116 is rotated from the closed position shown, port 136 no longer opens from the region of accelerated air flow. During open throttle operation, port 136 opens to induction passage 114 upstream of throttle 116, and the pressure at port 136 is intermediate the minimum pressure which occurs near area 120 and the inlet pressure of zone 123. As throttle 116 is rotated increasingly from the closed position shown, the pressure in chamber 132 approaches the inlet pressure.

In many engines the air flow must be adjusted in response to changes in operating conditions in order that the desired idle speed may be maintained. In the embodiments of FIGS. 1 and 2, however, the closed or minimum air flow position of throttle 16 or 116 may not be adjusted because, after adjustment, port 36 or 136 would not open adjacent the edge of the throttle. Accordingly, an engine air inlet assembly according to this invention may have an idle air bypass passage 142 which opens from the inlet zone 123 of induction passage 114 and discharges to induction passage 114 below throttle 116. Idle air bypass passage 142 includes an idle air control valve 144 of conventional construction for controlling idle air flow to the engine.

THE THIRD EMBODIMENT

Figure 3:
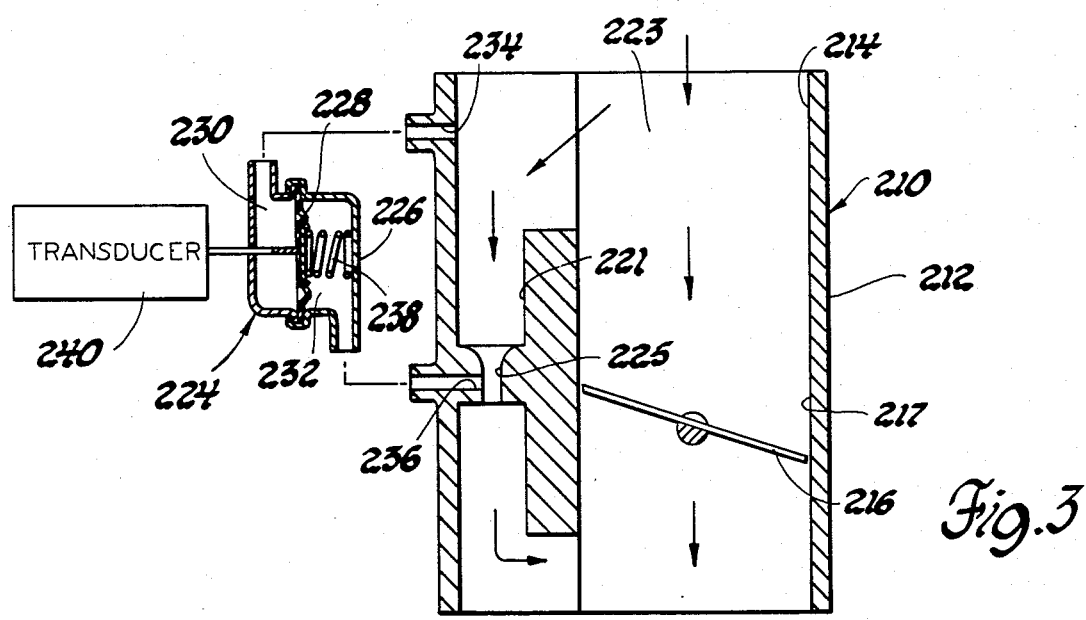
FIG. 3 is a schematic view of a third engine air inlet assembly incorporating an additional embodiment of this invention.

Referring to FIG. 3, an engine air inlet assembly 210 includes an air inlet body 212 defining an induction passage 214 for air flow to the engine. A throttle 216 of any desired configuration is disposed in a throttle bore portion 217 of induction passage 214 and is movable from the closed position shown to an open position to vary air flow through throttle bore 217.

Induction passage 214 also includes an air bypass portion 221 which opens from the inlet zone 223 of induction passage 214 and discharges to throttle bore 217 below throttle 216. Bypass 221 includes a restricted region 225.

A sensor 224 includes a housing 226 divided by a diaphragm 228 to form an inlet pressure sensing chamber 230 and a reduced pressure sensing chamber 232. Inlet pressure sensing chamber 230 is connected to an inlet pressure port 234 opening from the inlet zone 223 of induction passage 214. Reduced pressure sensing chamber 232 is connected to a reduced pressure port 236 opening from the restricted region 225 of bypass 221. The difference in pressure between the inlet pressure at port 234 and the reduced pressure at port 236 displaces diaphragm 228 rightwardly against the bias of a spring 238, and the displacement of diaphragm 228 is measured by a strain gage or other transducer 240. Transducer 240 produces an electrical signal which varies with the displacement of diaphragm 228.

The difference between the pressure at port 234 and the pressure at port 236 during the critical or sonic flow conditions which occur, for example, when throttle 216 is in the closed position shown is proportional to the pressure in the inlet zone 223. The signal from transducer 240 accordingly is a measure of the inlet air pressure during critical flow operating conditions.

It will be appreciated that, with the construction of this third embodiment, the closed or minimum air flow position of throttle 216 may be adjusted in order to maintain the desired engine idle speed.

The signal from transducer 40, 140 or 240 may be sampled to determine the inlet air pressure whenever the engine control system determines that throttle 16, 116 or 216 is closed to the position shown. The signal from transducer 240 also may be employed to determine the inlet air pressure whenever the engine control system determines that critical flow conditions are present—such as when the ratio of the manifold pressure below throttle 216 to the inlet pressure in zone 223 is less than about 0.528, or when the ratio of the reduced pressure in restricted region 225 to the inlet pressure in zone 223 is about 0.528.

In some applications it may not be necessary to connect chamber 30, 130 or 230 to port 34, 134 or 234. Simply opening chamber 30, 130 or 230 to the atmosphere or exposing the left side of diaphragm 28, 128 or 228 to the atmosphere will allow transducer 40, 140 or 240 to provide a signal which is a measure of the atmospheric pressure.

It will be appreciated that this invention may be employed in other embodiments having throttles of entirely different configuration—for example, throttles which reciprocate to vary an air flow area in the induction passage. Moreover, when a port opens adjacent the minimum air flow area of the induction passage under both closed and open throttle operating conditions, the transducer signal may be sampled to determine the inlet air pressure whenever the engine control system determines that the throttle is closed or nearly closed or that critical flow conditions are present.

It also will be appreciated that this invention may be employed in supercharged engines as well as naturally aspirated engines and in diesel engines as well as spark ignition engines. In a diesel engine, for example, a throttle could be closed momentarily during deceleration to create the conditions necessary to measure inlet air pressure.

The embodiments of the invention in which an exclusive property or privilege is claimed are defined as follows:

1. The method of measuring the pressure of air delivered to an engine having an inlet body forming an induction passage for air flow to the engine and a throttle in said induction passage controlling air flow therethrough, said inlet body having a reduced pressure port opening from a region of said induction passage through which the air flow occurs at sonic velocity during particular engine operating conditions, said method comprising the step of measuring the difference between the pressure upstream of said throttle and the pressure at said reduced pressure port during said engine operating conditions to thereby provide a measure of the absolute value of the pressure of the air delivered to the engine.

2. The method of measuring the pressure of air delivered to an engine having an inlet body forming an induction passage for air flow to the engine and a throttle in said induction passage controlling air flow therethrough, said inlet body having a reduced pressure port opening from a region of said induction passage in which the pressure is proportional to the pressure upstream of said throttle during particular engine operating conditions, said method comprising the step of measuring the difference between the pressure upstream of said throttle and the pressure at said reduced pressure port during said engine operating conditions to thereby provide a measure of the absolute value of the pressure of the air delivered to the engine.

3. The method of measuring the pressure of air delivered to an engine having an inlet body forming an induction passage for air flow to the engine and a throttle in said induction passage defining an air flow area in said induction passage between said throttle and the wall of said induction passage, said throttle being movable between open and closed positions for varying said air flow area between a maximum flow area and a minimum flow area to thereby control air flow through said induction passage, said inlet body having a reduced pressure port opening from said induction passage adjacent said minimum flow area, said method comprising the step of measuring the difference between the pressure upstream of said throttle and the pressure at said reduced pressure port when said throttle is in said closed position to thereby provide a measure of the absolute value of the pressure of the air delivered to the engine.

4. An engine air inlet assembly comprising an inlet body forming an induction passage for air flow to the engine, a throttle controlling air flow therethrough, said inlet body having a reduced pressure port opening from a region of said induction passage through which the air flow occurs at sonic velocity during particular engine operating conditions, and a sensor for measuring the difference between the pressure upstream of said throttle and the pressure at said reduced pressure port during said engine operating conditions to thereby provide a measure of the absolute value of the pressure upstream of said throttle.

5. An engine air inlet assembly comprising an inlet body forming an induction passage for air flow to the engine, a throttle in said induction passage controlling air flow therethrough, said inlet body having a reduced pressure port opening from a region of said induction passage in which the pressure is proportional to the pressure upstream of said throttle during particular engine operating conditions, and a sensor for measuring the difference between the pressure upstream of said throttle and the pressure at said reduced pressure port during said engine operating conditions to thereby provide a measure of the absolute value of the pressure upstream of said throttle.

6. An engine air inlet assembly comprising an inlet body forming an induction passage for air flow to the engine, a throttle in said induction passage defining an air flow area in said induction passage between said throttle and the wall of said induction passage, said throttle being movable between open and closed positions for varying said air flow area between a maximum flow area and a minimum flow area to thereby control air flow through said induction passage, said inlet body having a reduced pressure port opening from said induction passage adjacent said minimum flow area, and a sensor for measuring the difference between the pressure upstream of said throttle and the pressure at said reduced pressure port when said throttle is in said closed position to thereby provide a measure of the absolute value of the pressure upstream of said throttle.

7. An engine air inlet assembly comprising an inlet body forming an induction passage for air flow to the engine, a throttle in said induction passage defining an air flow area in said induction passage between said throttle and the wall of said induction passage, said throttle being movable between open and closed positions for varying said air flow area between a maximum flow area and a minimum flow area to thereby control air flow through said induction passage, said inlet body having an inlet pressure port opening from said induction passage upstream of said throttle and a reduced pressure port opening from said induction passage adjacent said minimum flow area, and a sensor for measuring the difference between the pressure at said inlet pressure port and the pressure at said reduced pressure port when said throttle is in said closed position to thereby provide a measure of the absolute value of the pressure in said induction passage upstream of said throttle.

8. An engine air inlet assembly comprising an inlet body forming an induction passage for air flow to the engine, a throttle in said induction passage rotatable between a closed position and open positions to control air flow through said induction passage, said inlet body having a reduced pressure port opening from said induction passage, said reduced pressure port being disposed adjacent said throttle when said throttle is in said closed position and downstream of said throttle when said throttle is in an open position, and a sensor for measuring the difference between the pressure upstream of said throttle and the pressure at said reduced pressure port when said throttle is in said closed position to thereby provide a measure of the absolute value of the pressure upstream of said throttle.

9. An engine air inlet assembly comprising an inlet body forming an induction passage for air flow to the engine, a throttle in said induction passage rotatable between a closed position and open positions to control air flow through said induction passage, said inlet body having a reduced pressure port opening from said induction passage, said reduced pressure port being disposed adjacent said throttle when said throttle is in said closed position and upstream of said throttle when said throttle is in an open position, and a sensor for measuring the difference between the pressure upstream of said throttle and the pressure at said reduced pressure port when said throttle is in said closed position to thereby provide a measure of the absolute value of the pressure upstream of said throttle.

10. An engine air inlet assembly comprising an inlet body forming an induction passage for air flow to the engine, said induction passage including a throttle bore portion and a bypass portion each opening from an engine air inlet zone, a throttle in said throttle bore portion controlling air flow therethrough, said bypass portion having a restricted region through which the air flow occurs at sonic velocity during particular engine operating conditions, said inlet body having a reduced pressure port opening from said region, and a sensor for measuring the difference between the pressure in said air inlet zone and the pressure at said reduced pressure port during said engine operating conditions to thereby provide a measure of the absolute value of the pressure in said air inlet zone.

* * * * *